(12) United States Patent
Konietzny (10) Patent No.: US 11,774,312 B2
(45) Date of Patent: Oct. 3, 2023

(54) METHOD FOR TESTING AND FOR AN INSPECTION OF A FUNCTIONALITY OF AN INSULATION WORK ON INDUSTRIAL INSTALLATIONS, ESPECIALLY OF AN INSULATION SURROUNDING A PIPE; SYSTEM COMPRISING A PIPE ESPECIALLY FOR TRANSPORT OF COOLED MEDIA, AND INSULATION FOR SUCH A PIPE

(71) Applicant: Rockwool A/S, Hedehusene (DK)

(72) Inventor: Thomas Marek Konietzny, Duisburg (DE)

(73) Assignee: Rockwool A/S, Hedehusene (DK)

( * ) Notice: Subject to any disclaimer, the term of this patent is extended or adjusted under 35 U.S.C. 154(b) by 78 days.

(21) Appl. No.: 17/311,532

(22) PCT Filed: Dec. 10, 2019

(86) PCT No.: PCT/EP2019/084364
§ 371 (c)(1),
(2) Date: Jun. 7, 2021

(87) PCT Pub. No.: WO2020/126652
PCT Pub. Date: Jun. 25, 2020

(65) Prior Publication Data
US 2022/0018728 A1    Jan. 20, 2022

(30) Foreign Application Priority Data

Dec. 18, 2018 (EP) .................................. 18213613

(51) Int. Cl.
*G01M 3/28* (2006.01)
*F16L 59/00* (2006.01)

(52) U.S. Cl.
CPC .......... *G01M 3/2815* (2013.01); *G01M 3/283* (2013.01)

(58) Field of Classification Search
CPC ............... G01M 3/00; G01M 3/26–28; G01M 3/2815; G01M 3/283; F16L 59/00–10
See application file for complete search history.

(56) References Cited

U.S. PATENT DOCUMENTS

| 5,361,622 A | 11/1994 | Wall |
| 10,955,071 B1* | 3/2021 | Parazoo .................. F16L 59/04 |

(Continued)

FOREIGN PATENT DOCUMENTS

| DE | 3213821 A1 | 10/1983 |
| GB | 2040011 A | 8/1980 |

*Primary Examiner* — Nguyen Q. Ha
(74) *Attorney, Agent, or Firm* — Harness, Dickey & Pierce, P.L.C.

(57) ABSTRACT

Method for testing and for an inspection of a functionality of an insulation work on industrial installations, especially a proper installation of an insulation surrounding a pipe, especially for transport of cooled media, whereby the insulation comprises at least one insulation element, preferably of an open porous material, especially made of bound mineral fibres, and a vapor barrier surrounding the insulation in an airtight manner at all ambient faces, whereby a pump is connected to a valve being connected to the insulation element, whereby the valve connects the inner part of the insulation with the surrounding area, whereby the inner air pressure of the insulation is increased or decreased by the pump to a predetermined pressure, preferably by up to 50 kPa above or underneath a surrounding atmospheric pressure, whereby the predetermined pressure is displayed on a gauge and whereby the stability of the predetermined pressure is tested and/or inspected during a predetermined time interval.

17 Claims, 4 Drawing Sheets

(56) References Cited

U.S. PATENT DOCUMENTS 11,047,517 B2 * 6/2021 Vaze .................... F16L 59/028
2018/0017463 A1 1/2018 Stonitsch

* cited by examiner

METHOD FOR TESTING AND FOR AN INSPECTION OF A FUNCTIONALITY OF AN INSULATION WORK ON INDUSTRIAL INSTALLATIONS, ESPECIALLY OF AN INSULATION SURROUNDING A PIPE; SYSTEM COMPRISING A PIPE ESPECIALLY FOR TRANSPORT OF COOLED MEDIA, AND INSULATION FOR SUCH A PIPE

CROSS-REFERENCE TO RELATED APPLICATIONS

This application is a U.S. National Phase Application under 35 U.S.C. 371 of International Application No. PCT/EP2019/084364, filed on Dec. 10, 2019, which claims the benefit of European Patent Application No. 18213613.5, filed on Dec. 18, 2018. The entire disclosures of the above applications are incorporated herein by reference.

FIELD

The disclosure relates to a method for testing and for an inspection of a functionality of an insulation work on industrial installations, especially a proper installation of an insulation surrounding a pipe, especially for transport of cooled media, whereby the insulation comprises at least one insulation element, preferably of an open porous material, especially made of bound mineral fibres, and a vapor barrier surrounding the insulation in an airtight manner at all ambient faces. Furthermore, the disclosure relates to a system comprising a pipe, especially for transport of cooled media, an insulation, a valve, a pump and a gauge, whereby the insulation comprises at least one insulation element preferably of an open porous material, especially made of bound mineral fibres, and a vapor barrier surrounding the insulation in an airtight manner at all ambient faces. Finally, the disclosure relates to an insulation for a pipe, especially for transport of cooled media, comprising at least one insulation element, preferably of an open porous material, especially made of bound mineral fibres, and a vapor barrier surrounding the insulation in an airtight manner at all ambient faces.

BACKGROUND

This section provides background information related to the present disclosure which is not necessarily prior art.

The technical field of the disclosure concerns the insulation work on industrial installations and in technical building equipment. These comprise production and distribution installations, e.g. appliances, vessels, columns, tanks, steam generators, pipe systems, heating, ventilation, air-conditioning, and hot and cold water installations. The disclosure is most suitable for pipe systems, in particular pipes for the transport of cooled media, ventilation, air-conditioning and cold water installations. Without limiting the scope, the disclosure is further on described in respect to insulation of pipes for transport of cooled media (cold insulation) and a respective system comprising such pipe.

In the insulation of pipes for the transport of cooled media, for example cold drinking water pipes, rain water pipes, coolant pipes or the like, the dew point temperature of the ambient air is generally of interest within the insulation system. To prevent condensation on the pipe the insulation system, containing pipes, made of bound mineral fibres has to be provided with a vapor barrier and which insulation system is fixed to the pipe in a tight and especially airtight manner at all ambient faces. This is to prevent areas in which the pipe can get into contact with the ambient air causing condensation of water vapor on the outer surface of the pipe. All ambient faces of the insulation system in the context of the disclosure is to be understood to cover all surfaces of the insulation system disposed to the ambient air surrounding the installation as well as lateral end faces of a systems insulation section. It has to be prevented that moisture coming into existence because of the condensation diffuses into the insulation, because this moisture may harm the insulation and reduces its thermal insulation characteristics. Moreover, the ingress of moisture into the insulation system enhances corrosion on the pipe or installation.

In the area of an insulation of a pipe for the transport of cooled media different materials may be used, which can prevent the diffusion of humidity into the insulation system. Therefore, these materials can avoid the formation of water vapor condensation. One of the widely used materials are closed-cell soft foams for example made of vinyl rubber (synthetic rubber) which establish an insulation, since the diffusion of humidity can be effectively prevented if the insulation is properly installed. Another material for the before mentioned purposes is foam glass which has advantages with respect to fire protection requirements compared to closed-cell soft foams. Foam glass is usually used as an insulation in this field and made of glass, which is foamed in heat. Foam glass is not combustible. It is also a closed-cell insulation material and molded parts are cut from a block and glued tightly to the pipes and fittings with a bituminous adhesive. Foam glass is a quite high-prized insulation and its production is very complex.

On the other hand, insulating materials made of bound mineral fibres, i.e. factory made mineral wool (MW) according to Standard EN 14303:2015, can be used if these materials are equipped with a vapor-impermeable lamination e.g. of an aluminum foil. Such lamination—a vapor barrier in sense of the DIN 4140:2014-04 "Insulation work on industrial installations and building equipment—Execution of thermal and cold insulation" is required to be practically impermeable to air- and water-vapor diffusion with a water vapor diffusion equivalent air layer thickness $s_d \geq 1500$ m.

A preferred insulation made of bound mineral fibres is based on stone wool products being open porous, vapor-permeable and being equipped with a particularly stable fibreglass-reinforced aluminum lamination. The aluminum lamination takes over the tasks of a vapor barrier in these insulation elements. As the dew point for cooling pipes lays within the insulation it is essential that all joints, penetrations and connection points are taped with adhesive tapes preventing that the humidity from the ambient air penetrates the insulation elements and therefore condenses inside the insulation elements.

As this feature of an insulation system is very important to guarantee, the performance of the insulation system has to be checked after its completion.

US 2018/0017463 A1 discloses a method for forming a field joint between pipe sections. This method is preferably described for pre-insulated pipe sections containing a carrier pipe surrounded by insulation and an outer jacket. Carrier pipes are joined and an air tube is positioned so that its first end is within the joint area and its second end extends beyond the joint area. A sleeve is sealed over the joint area, joining the jackets, with the sleeve positioned to cover the first end but not the second end of the tube. Air is injected into the tube to pressurize the cavity within the jacket, and the tube bore is sealed to allow air pressure testing. If the testing shows no loss of air pressure, the bore of the tube is sealed permanently to complete the seal on the field joint. This document also describes a piping system having a field joint formed by this method.

One disadvantage of this method and this piping system is that only a short part of the insulation, namely the joint area is tested shortly after the installation of the insulation. This method does not indicate areas outside the joint area with respect to their tightness. Furthermore, this known method does not allow to repeat the testing of airtightness and to inspect the functionality of the insulation at a later stage for example after initial operation of the system.

SUMMARY

This section provides a general summary of the disclosure, and is not a comprehensive disclosure of its full scope or all of its features.

Therefore, it is an object of the disclosure to provide a method with which a proper installation of an insulation surrounding a pipe can be tested and inspected with respect to its functionality even after an initial operation, which insures that a whole section of the insulation surrounding the pipe can be tested and inspected easily and which provides an improved heat insulation.

This object is achieved by a method including the step of connecting a pump to a valve being connected to the insulation element, whereby the valve connects the inner part of the insulation with the surrounding atmosphere, whereby the inner air pressure of the insulation is increased or decreased by the pump to a predetermined pressure, preferably by up to 50 kPa above or underneath a surrounding atmospheric pressure, whereby the predetermined pressure is displayed on a gauge and whereby the stability of the predetermined pressure is tested and/or inspected during a predetermined time interval.

Furthermore, the before mentioned object is achieved by a system with a valve connecting the inner part of the insulation with the surrounding atmosphere being connected or connectable to the insulation element, whereby a pump is connectable to the valve for increasing or decreasing the inner air pressure of the insulation to a predetermined pressure, and whereby the inner pressure is displayed on a gauge.

Finally, the before mentioned object is achieved with an insulation for a pipe comprising at least one insulation element being provided with the valve allowing to increase or to decrease the inner air pressure of the insulation element by a pump to a predetermined pressure different to the surrounding atmospheric pressure.

According to the disclosure the proper processing of mineral fibres products as cold insulation systems of piping systems is ensured. The use of a valve and a pump with a gauge allows the testing and the inspection of the functionality of the insulation within a certain section of the insulation. Furthermore, by applying a vacuum or negative air pressure inside the insulation the thermal insulation properties of the system can be improved. Especially, by regularly testing and inspecting the insulation it can be avoided that moisture inside the insulation stays undetected so that not only the insulation is damaged but also corrosion may occur at the pipe, a phenomenon known as Corrosion under insulation (CUI). Corrosion which damages the pipe is a result of water vapor condensation which causes damages of billions of Euro in Europe. By regularly testing and inspecting sections of the insulation imperfect insulation systems can be detected and repaired or replaced so that the pipes are prevented from such corrosion damages. Furthermore, by using properly working insulation systems the heating of the cold medium can be reduced which saves a lot of money by reducing the energy needed to cool the medium.

It is a further aspect of the disclosure that the testing and/or the inspecting is repeated within predetermined time intervals. Such a testing and inspecting can be done because the valves remain accessible and a pump can be connected to the valve easily and the method for testing and for inspection of the functionality can be executed in short time without opening the insulation. If the insulation is still in good shape and fulfills its function, there is no need to remove and renew the insulation. Preferably, the whole insulation is subdivided into sections of certain lengths which can be longer in the area of pipes only and which need to be shorter in the areas of ceilings, terminals, internals, penetrations, transitions, outgoing pipes, pipe crossing sections and the like as these parts may tend more to be imperfect with respect to their airtightness. If such a defect is discovered it is cost saving just to remove and renew or to repair a short section compared to renewing the whole insulation of an insulation system. An average length of such a section in the area of pipes is about 3 to 4 meters. All sections and especially all joints, penetrations and connection points are therefore taped with adhesive tapes to prevent that the humidity from the ambient air penetrates into and condenses inside the insulation system.

According to a further feature of the method according to the disclosure the insulation is permanently evacuated. According to this feature a pressure inside the insulation underneath a surrounding atmospheric pressure is established and held up for example by closing the valve after evacuating the insulation. The underpressure of the insulation decreases the thermal conductivity of the insulation which means that the insulation has increased thermal characteristics with respect to the insulation function. Such an underpressure can be tested and inspected from time to time to maintain the underpressure within the insulation which may require a reestablishment of the underpressure because of a leakage of the valve or a leakage in the area of the connection of the valve to the insulation.

Preferably, the results of each testing and inspecting are kept in records and the results are used to be compared. This step of the method facilitates the testing and inspection and the surveillance of a possibly leaking section of the insulation and/or valve. Even if the results of testing and inspection are adequate it may be seen from the records that a leakage can arise in the future and therefore a renewing of the insulation may be necessary in advance.

Finally, with respect to the method the inner air pressure of the insulation is increased first for testing the leak tightness before the inner air pressure of the insulation is decreased to a certain underpressure for improving the heat insulation properties of the insulation.

According to a preferred embodiment of the system according to the disclosure the insulation comprises insulation elements having a bulk density between 40 and 130 kg/m$^3$, preferably between 90 and 115 kg/m$^3$ and/or insulation elements, especially in the area of a connection to a building, e.g. to a wall or a ceiling, having a bulk density between 150 and 240 kg/m$^3$, preferably between 200 and 230 kg/m$^3$. Such higher densities are required in areas where the insulation elements, respectively the insulation system are connected to a building by e.g. a hanging or suspension device and a pipe clip surrounding the elements. Therefore, at those connection areas insulation elements of a higher density are mounted in order to provide a respective resistance against compression forces from the pipe clips.

The insulation elements are perfectly suitable for the use in the field of insulation of pipes, especially pipes for the transport of cooled media. These insulation elements have adequate insulation characteristics and can be easily evacuated by using a method according to the disclosure. Furthermore, these insulation elements can be easily fixed to pipes giving an airtight installation.

A further aspect of the system and the insulation according to the disclosure is a valve having a connecting part provided with a screw thread with which the valve is screwed into the insulation element. Such a valve can be easily incorporated into an insulation element made of bound mineral fibres. After the valve has been screwed into the insulation element and through the lamination it is only necessary to seal the connection between the valve and the insulation element by using adhesive tapes being fixed to the lamination at the contacting point of the valve to the insulation element.

The lamination as described before is required to be practically impermeable to air- and water-vapor diffusion; it takes over the tasks of a vapor barrier. Preferably the vapor barrier is made from a metal foil, preferably from alloy, forming the lamination and being fixed to outer faces of the insulation and preferably having a $s_d$-value of $\geq 1500$ m. Such a metal foil can for example be easily removed partly to incorporate the valve into the insulation element. Of course, it will be necessary to seal the connection between valve and insulation element by using adhesive tapes surrounding the valve.

According to a further aspect of the disclosure the insulation elements are made from laminated pipe shells and/or a laminated lamella mat. The laminated pipe shells can be easily fixed to the pipes whereby the pipe shells have an inner diameter essentially corresponding with the outer diameter of the pipe to be insulated. Laminated lamella mats are preferably used in the areas of joints, penetrations and connection points because the lamella mats are highly flexible with respect to a bending process which is necessary to adopt the lamella mats to the joints, penetrations and connecting points. In some cases, it will be necessary to use lamella mats in more than one layer.

Furthermore, the system according to the disclosure has preferably two insulation elements being arranged adjacent to each other whereby the insulation elements are sealed by using a tape being fixed to both abutting ends of the insulation elements. Preferably, laminated pipe shells being in contact with their abutting ends can be sealed by using a tape which carries a transition point of two pipe shells and which is connected to both pipe shells in the area of the transition point.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further embodiments and features of the disclosure are disclosed in the subclaims and are described in the following description of the drawings showing preferred embodiments of the disclosure. In the drawings

Corresponding reference numerals indicate corresponding parts throughout the several views of the drawings.

DETAILED DESCRIPTION

Example embodiments will now be described more fully with reference to the accompanying drawings.

Figure 1:
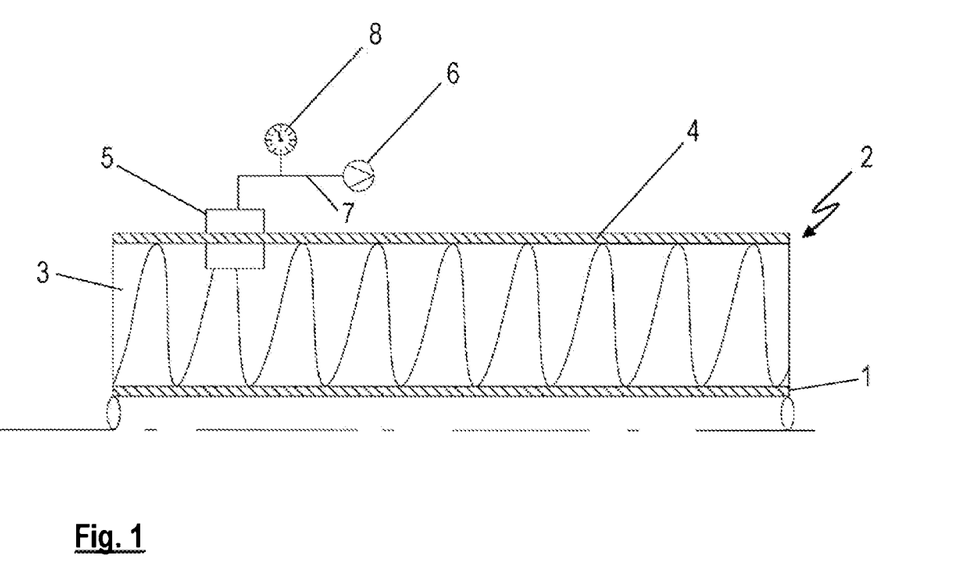
FIG. 1 shows a schematic diagram representing a cross-sectional view of an insulated pipe section.

FIG. 1 shows a system comprising a pipe 1 for transport of cooled media and an insulation 2 in form of a pipe shell 3 made from stone wool fibres and a binding agent and being covered on its outside surface with a metal foil 4 made from alloy.

The pipe shell 3 has a bulk density of 110 kg/m$^3$ and consists of two halves being connected to each other along one longitudinal flange. The pipe shell 3 has an opening with an inner diameter corresponding to an outer diameter of the pipe 1, so that an inner surface of the pipe shell 3 is in contact with an outer surface of the pipe 1.

The system is equipped with a valve 5 being connected to a pump 6 via a conduit 7 through which the pipe shell 3 can be evacuated to reach a predetermined air pressure of approximately 40 kPa underneath a surrounding atmospheric pressure.

Furthermore, the system comprises a gauge 8 being connected to the conduit 7 and being able to measure the air pressure inside the conduit 7 which is equivalent to the pressure inside the pipe shell 3.

Figure 2:
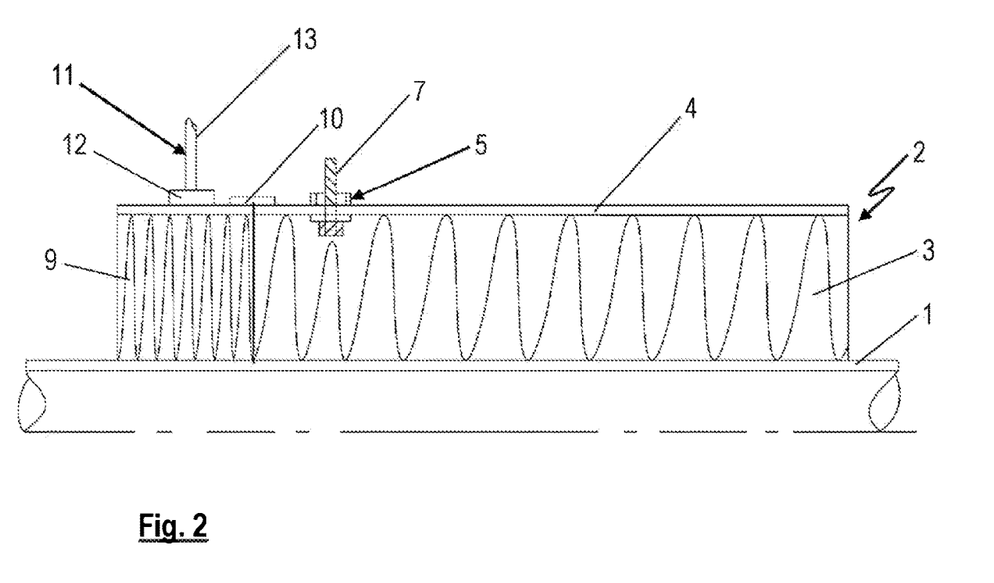
FIG. 2 shows a schematic diagram representing a cross-sectional view of a second embodiment of an insulated pipe section.

FIG. 2 illustrates a second embodiment of the system which compared to FIG. 1 additionally contains a second insulation element 9 being covered by a metal foil 4, too. This second insulation element 9 is arranged adjacent to the pipe shell 3 whereby the abutting ends of the pipe shell 3 and the insulation element 9 are in contact to each other. The outer surface of the insulation element 9 and the pipe shell 3 is sealed with a tape 10 which is applied to the outer surface of the insulation element 9 and the pipe shell 3 in a joint area so that both elements are in contact with the tape 10. The tape 10 on one surface is equipped with an adhesive, e.g. a self-adhesive layer, which adhesive securely attaches the tape to the outer metal foil surface of the insulation element 9 and the pipe shell 3.

Figure 3:
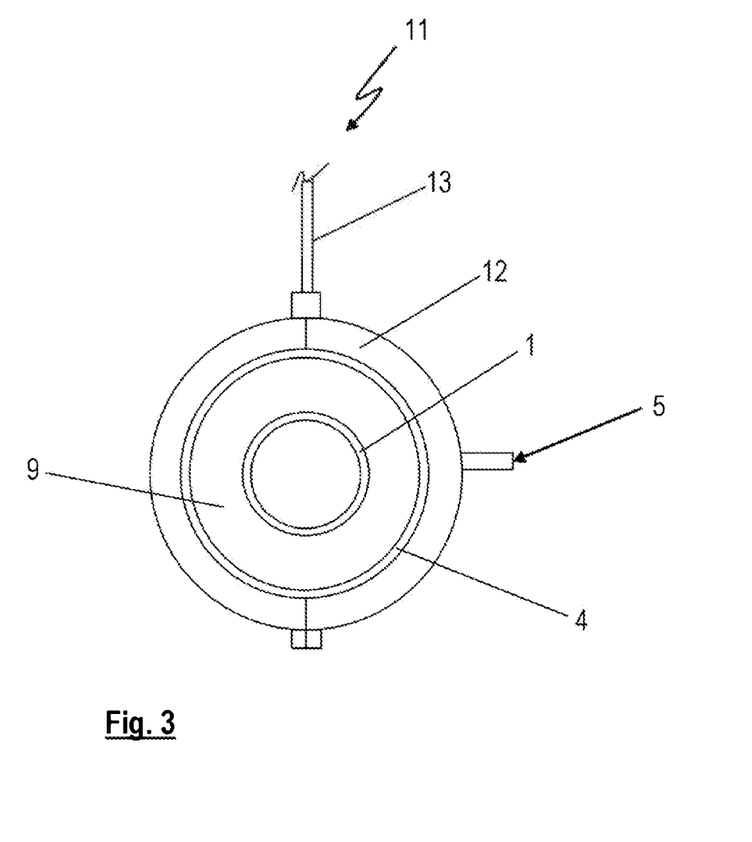
FIG. 3 shows a schematic diagram representing a cross-sectional view of the embodiment according to FIG. 2 and FIG. 4 a more detailed diagram representing a cross-sectional view of the insulated pipe section according to FIG. 2.

Furthermore, as can also be derived from FIG. 3 the insulation element 9 is equipped with a hanging respectively a suspension device 11 having a ring like element 12 (a pipe clip) surrounding the insulation element 9 and being connected to a bar like element 13 connecting the ring like element 12 to a ceiling or a wall of a building and not being shown in FIG. 3. Therefore, in order to provide a respective resistance against compression forces applied by a ring like element 12 (a pipe clip) the insulation element 9 at those connection areas comprises a higher density. In the present embodiment, the insulation element 9 has a bulk density of 220 kg/m$^3$.

Figure 4:
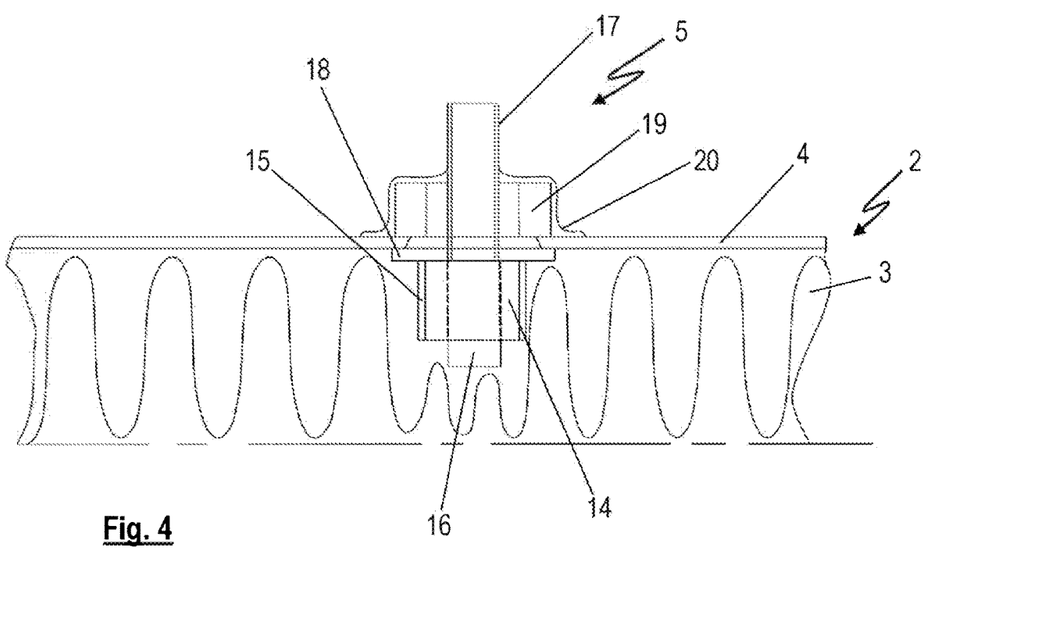

FIG. 4 shows a more detailed embodiment of the valve 5 being inserted to the pipe shell 3.

The valve 5 comprises a cylindrical shaped body 14 having a screw thread 15 on its outer surface. The body 14 is penetrated by a tube 16 which ends inside the pipe shell 3 and which has on the other end a part being equipped with a screw thread 17. The body 14 has a ring like part 18 which is arranged between the metal foil 4 and the body 14 having the screw thread 15.

A nut 19 is screwed on the screw thread 17 of the tube 16 thereby clamping the metal foil 4 between the ring like part 18 and the nut 19 which already tightens the area of the insulation 2 into which the valve 5 is incorporated. Additionally, the respective surfaces of the ring like part 18 and the nut 19 clamping the foil 4 may comprise a sealant or sealing mastic to ensure airtightness of the connection.

Furthermore, an adhesive tape 20 covers the whole nut 19 and is fixed on the first side to the tube 16 in the area of the screw thread 17 and with the other end at the metal foil 4 being connected to the pipe shell 3.

The not shown conduit 7 can be connected to the tube 16 in an airtight manner so that via the conduit 7 connected to the pump 6 the pipe shell 3 can be evacuated to generate an underpressure inside the pipe shell 3 compared to the surrounding atmospheric pressure. The stability of the underpressure can be measured by the gauge 8 not shown in FIG. 4.

By checking the gauge during a certain time interval it can be seen if the pipe shell 3 is arranged in an airtight manner to the pipe 1 so that humidity from the ambient air does not penetrate into the insulation 2 and condenses inside the insulation 2 or between the outer shell of the pipe 1 and the pipe shell 3 which may cause corrosion at the pipe 1 being made from metal.

The valve 5 is a back-pressure valve which closes for example after a predetermined air pressure is achieved in the pipe shell 3. This predetermined pressure can be maintained but of course the valve 5 will not be airtight the whole time as this is for example dependent on the outer side pressure and for example on the outside and inside temperature. Therefore, the air pressure inside the pipe shell 3 has to be checked from time to time and it is very easy to re-establish the predetermined pressure as the valve 5 is connected to the insulation 2 and can be used at any time to check or to control the pressure inside the insulation 2.

For this purpose, the pump 6 is connected via the conduit 7 to the valve 5 whereby the valve 5 connects the inner part of the insulation 2 with the surrounding area. In the next step the inner air pressure of the insulation 2 is for example decreased by the pump 6 to a predetermined pressure underneath the surrounding atmospheric pressure and the predetermined pressure inside the insulation 2 is displayed on the gauge 8. During a predetermined time interval, the stability of the predetermined pressure is tested and inspected.

The testing and/or the inspecting is repeated within predetermined time intervals. In case the predetermined pressure has changed it has to be decided whether the loss of predetermined pressure results from a defect of the insulation 2 or results from the normal loss of pressure caused by the before mentioned influencing parameters. If the loss of pressure within a time interval is too high, it is a sign that the insulation 2 is defect and has to be repaired or renewed. For inspection and testing the results are kept in records and are used to be compared.

The present disclosure proposes a method of testing the functionality of a cold insulation on a technical installation by way of extracting or partly extraction (applying a small vacuum) of air from the insulation system. For this purpose, special equipment is used. By withdrawing the air from the insulation system with a special vacuum pump, a negative pressure (vacuum) is generated in the insulation system. If a constant slightly negative pressure can be established it is assumed that the insulation system is leak-proof or airtight. The vacuum pump is connected via a special valve integrally built into the insulating material. Generating a constant negative pressure for a certain time (estimated at 5 to 10 minutes) will ensure and prove that the vapor barrier has been properly installed and that joints etc. are effectively sealed.

The method according to the disclosure which is a method of testing the functionality of a cold insulation on a technical installation comprises especially the steps of connecting a vacuum pump to said insulation system via a valve, withdrawal of air from the insulation system generating a negative pressure (vacuum) in the system, measuring and estimating airtightness and the leak-proof of the system, and finally marking the tested area for documentation. Optionally the method can be repeated frequently for example during annual inspections.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for testing and for an inspection of a functionality of an insulation work on industrial installations, especially a proper installation of an insulation surrounding a pipe, especially for transport of cooled media, whereby the insulation comprises at least one insulation element, preferably of an open porous material, especially made of bound mineral fibres, and a vapor barrier surrounding the insulation in an airtight manner at all ambient faces, wherein
   a pump is connected to a valve being connected to the insulation element, whereby the valve connects the inner part of the insulation with the surrounding atmosphere,
   whereby the inner air pressure of the insulation is increased or decreased by the pump to a predetermined pressure, preferably by up to 50 kPa above or underneath a surrounding atmospheric pressure,
   whereby the predetermined pressure is displayed on a gauge, and
   whereby the stability of the predetermined pressure is tested and/or inspected during a predetermined time interval.

2. The method according to claim 1,
   wherein
   the testing and/or the inspecting is repeated within predetermined time intervals.

3. The method according to claim 1,
   wherein
   the insulation is permanently evacuated.

4. The method according to claim 1,
   wherein
   the results of each testing and inspecting are kept in records and that the results are used to be compared.

5. The method according to claim 1,
wherein
the inner air pressure of the insulation is increased first for testing the leak tightness before the inner pressure of the insulation is decreased for improving the heat insulation properties of the insulation.

6. A system comprising a pipe especially for a transport of cooled media, an insulation, a valve, a pump and a gauge, whereby the insulation comprises at least an insulation element of an open porous material made of bound mineral fibres, and a vapor barrier surrounding the insulation in an airtight manner at all ambient faces, whereby the valve connects the an inner part of the insulation with the surrounding area and is connected or connectable to the insulation element, whereby the pump is connectable to the valve for increasing or decreasing the inner air pressure of the insulation to a predetermined pressure, and whereby the inner pressure is displayed on the gauge.

7. The system according to claim 6,
wherein
the insulation comprises insulation elements having a bulk density between 40 and 130 kg/m$^3$, preferably between 90 and 115 kg/m$^3$ and/or insulation elements, especially in the area of a connection to a building, especially to a wall or a ceiling, having a bulk density between 150 and 240 kg/m$^3$, preferably between 200 and 230 kg/m$^3$.

8. The system according to claim 6,
wherein
the valve has a connecting part with a screw thread with which the valve is screwed into the insulation element.

9. The system according to claim 6,
wherein
the vapor barrier is made from a metal foil, preferably from alloy, which is fixed to outer faces of the insulation and preferably having a s$_d$-value of ≥1500 m.

10. The system according to claim 6,
wherein
the insulation elements are made from laminated pipe shells and/or a laminated lamella mat.

11. The system according to claim 6,
wherein
two insulation elements arc arranged adjacent to each other and in that the insulation elements are sealed by using a tape being fixed to both abutting ends of the insulation elements.

12. An insulation for a pipe, especially for transport of cooled media, comprising at least one insulation element of an open porous material made of bound mineral fibres, and a vapor barrier surrounding the insulation in an airtight manner at all ambient faces,
wherein
the insulation element is provided with a valve allowing to increase or to decrease the inner air pressure of the insulation element by a pump to a predetermined pressure.

13. The insulation according to claim 12,
wherein
the insulation comprises insulation elements having a bulk density between 40 and 130 kg/m$^3$, preferably between 90 and 115 kg/m$^3$ and/or insulation elements, especially in the area of connection to a building, especially to a wall or a ceiling having a bulk density between 150 and 240 kg/m$^3$, preferably between 200 and 230 kg/m$^3$.

14. The insulation according to claim 12,
wherein
the valve has a connecting part with a screw thread with which the valve is screwed into the insulation element.

15. The insulation according to claim 12,
wherein
the vapor barrier is made from a metal foil, preferably from alloy, which is fixed to outer faces of the insulation and preferably having a s$_d$-value of ≥1500 m.

16. The insulation according to claim 12,
wherein
the insulation elements are made from laminated pipe shells and/or a laminated lamella mat.

17. The insulation according to claim 12,
wherein
two insulation elements are arranged adjacent to each other and in that the insulation elements are sealed by using a tape being fixed to both abutting ends of the insulation elements.

* * * * *